(12) United States Patent
Furutake

(10) Patent No.: US 12,263,793 B2
(45) Date of Patent: Apr. 1, 2025

(54) IMAGING APPARATUS

(71) Applicant: DENSO CORPORATION, Kariya (JP)

(72) Inventor: Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/158,033

(22) Filed: Jan. 23, 2023

(65) Prior Publication Data
US 2023/0234518 A1 Jul. 27, 2023

(30) Foreign Application Priority Data

Jan. 25, 2022 (JP) .................................. 2022-009661

(51) Int. Cl.
*B60R 11/04* (2006.01)
*H04N 23/55* (2023.01)

(52) U.S. Cl.
CPC ............. *B60R 11/04* (2013.01); *H04N 23/55* (2023.01)

(58) Field of Classification Search
CPC . B60R 11/04; B60R 2011/0026; H04N 23/51; H04N 23/55; H04N 23/57
USPC ........................................................ 348/148
See application file for complete search history.

(56) References Cited

U.S. PATENT DOCUMENTS

| | | | |
|---|---|---|---|
| 9,635,230 B2 | 4/2017 | Winden et al. | |
| 10,462,375 B2 | 10/2019 | Wang et al. | |
| 2017/0064167 A1* | 3/2017 | Winden | ................. C09J 163/00 |
| 2018/0284398 A1* | 10/2018 | Furutake | ................ G02B 13/18 |
| 2019/0381952 A1* | 12/2019 | Wang | ....................... G02B 7/02 |
| 2022/0295037 A1* | 9/2022 | Teranishi | ............... G02B 7/028 |

FOREIGN PATENT DOCUMENTS

| | | |
|---|---|---|
| JP | 2003-289457 A | 10/2003 |
| JP | 2004-297282 A | 10/2004 |
| JP | 2006-148473 A | 6/2006 |
| JP | 2009-157184 A | 7/2009 |
| JP | 2021-144085 A | 9/2021 |

* cited by examiner

*Primary Examiner* — Kathleen M Walsh
(74) *Attorney, Agent, or Firm* — Maschoff Brennan

(57) ABSTRACT

In an imaging apparatus, a protrusion member of a lens barrel is arranged to protrude, from an outer surface of a barrel body, toward a direction away from an optical axis of a lens. The protrusion member includes an upper portion. The upper portion is located above the optical axis of the lens, and has an upper end. The protrusion member includes a lower portion. The lower portion is located below the optical axis of the at least one lens, and has a lower end. The upper end of the upper portion has a first minimum distance with respect to the optical axis of the lens, and the lower end of the lower portion has a second minimum distance with respect to the optical axis of the lens. The protrusion member is configured such that the first minimum distance is smaller than the second minimum distance.

9 Claims, 12 Drawing Sheets

IMAGING APPARATUS

CROSS-REFERENCE TO RELATED APPLICATION

This application is based on and claims the benefit of priority from earlier Japanese Patent Application No. 2022-009661 filed on Jan. 25, 2022, the entire disclosure of which is incorporated herein by reference.

TECHNICAL FIELD

The present disclosure relates to imaging apparatuses to be installed in a vehicle.

BACKGROUND

Known imaging apparatuses include a lens, and a lens barrel comprised of a barrel body and a flange projecting from the lens barrel; the lens is accommodated in the barrel body. The known imaging apparatuses also include a circuit board with an imager disposed thereto, and a case that holds the circuit board. U.S. Pat. No. 9,635,230 discloses one of these imaging apparatuses.

Specifically, the US patent publication discloses a method of assembling such an imaging apparatus, which includes (i) dispensing an uncured adhesive between the flange of the lens barrel and the case to adhesively secure the barrel body to the case, (ii) bringing the lens into focus with the imager, and (iii) curing, with the lens in focus with the imager, the adhesive to thereby fixedly determine a distance between the focal point of the lens and the imager.

SUMMARY

User's request level for the adhesive positioning accuracy of the barrel body relative to the case of such an imaging apparatus has been increasing over time. The uncured adhesive dispensed between the flange of the lens barrel and the case shrinks while being cured. The cure shrinkage of the adhesive may impact the adhesive positioning accuracy of the barrel body relative to the case, resulting in a decrease in an imaging accuracy of the imaging apparatus.

Additionally, the barrel body of a lens barrel, in which a lens is accommodated, of an imaging apparatus to be installed in a vehicle is desired to be arranged as adjacently as possible to the front windshield of the vehicle. The flange of the lens barrel of the imaging apparatus disclosed in the US patent publication, which is needed for attachment of the barrel body to the case, may make it difficult to arrange the barrel body of the lens barrel as adjacently as possible to the front windshield.

In view of the circumstances set forth above, an aspect of the present disclosure seeks to provide imaging apparatuses, each of which is designed to enable a barrel body of a lens barrel to be arranged as adjacently as possible to a front glass while holding a reduction in an imaging accuracy of the corresponding imaging apparatus to a minimum.

An exemplary measure the present disclosure provides an imaging apparatus to be installed in a vehicle in which a height direction of the imaging apparatus is perpendicular to a width direction of the vehicle, the vehicle including a front windshield. The imaging apparatus includes at least one lens having an optical axis that is perpendicular to the height direction and the width direction. The imaging apparatus includes a lens barrel located adjacently to the front windshield. The lens barrel includes a barrel body in which the at least one lens is accommodated. The barrel body has an outer surface around the optical axis. The lens barrel includes a protrusion member arranged to protrude, from the outer surface of the barrel body, toward a direction away from the optical axis of the at least one lens. The imaging apparatus includes a circuit module comprised of a circuit board and an imager mounted to the circuit board. The imaging apparatus includes an adhesive, and a case arranged to hold at least the circuit board.

The case has a facing end surface. The facing end surface of the case has an adhesive section that faces the protrusion member with the adhesive interposed between the facing end surface and the protrusion member. The facing end surface of the case has a non-adhesive section that faces the protrusion member without intervention of the adhesive between the non-adhesive section and the protrusion member.

The protrusion member includes an upper portion located above the optical axis of the at least one lens in the height direction. The upper portion has an upper end in the height direction. The protrusion member includes a lower portion located below the optical axis of the at least one lens in the height direction. The lower portion has a lower end in the height direction. The upper end of the upper portion has a first minimum distance with respect to the optical axis of the at least one lens, and the lower end of the lower portion has a second minimum distance with respect to the optical axis of the at least one lens. The protrusion member is configured such that the first minimum distance is smaller than the second minimum distance.

Measurement of an interval between the non-adhesive section of the facing end surface and the protrusion member in the optical axis of the at least one lens enables measurement of an equivalent of a thickness of an uncured adhesive interposed between the adhesive section of the facing end surface and the protrusion member during manufacturing of the imaging apparatus. This therefore enables the amount of cure shrinkage of the uncured adhesive to be obtained based on the measured equivalent of the thickness of the adhesive, making it possible to locate the circuit board at a position offset, by a distance based on the measured amount of cure shrinkage of the uncured adhesive, from a predetermined reference position for the circuit board in the optical axis of the at least one lens. This therefore holds a reduction in an imaging accuracy of the imaging apparatus to a minimum.

In addition, the upper end of the upper portion of the protrusion member has a first minimum distance with respect to the optical axis of the at least one lens, and the lower end of the lower portion of the protrusion member has a second minimum distance with respect to the optical axis of the at least one lens. The protrusion member is configured such that the first minimum distance is smaller than the second minimum distance.

This makes it possible to arrange the imaging apparatus as adjacently as possible to the front windshield while enabling the protrusion member, i.e., the lens barrel, to be less likely to interfere with the front windshield.

Accordingly, the exemplary measure holds a reduction in an imaging accuracy of the imaging apparatus due to shrinkage of the uncured adhesive GL to a minimum, and arrange the imaging apparatus as adjacently as possible to the front windshield while enabling the lens barrel to be less likely to interfere with the front windshield.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
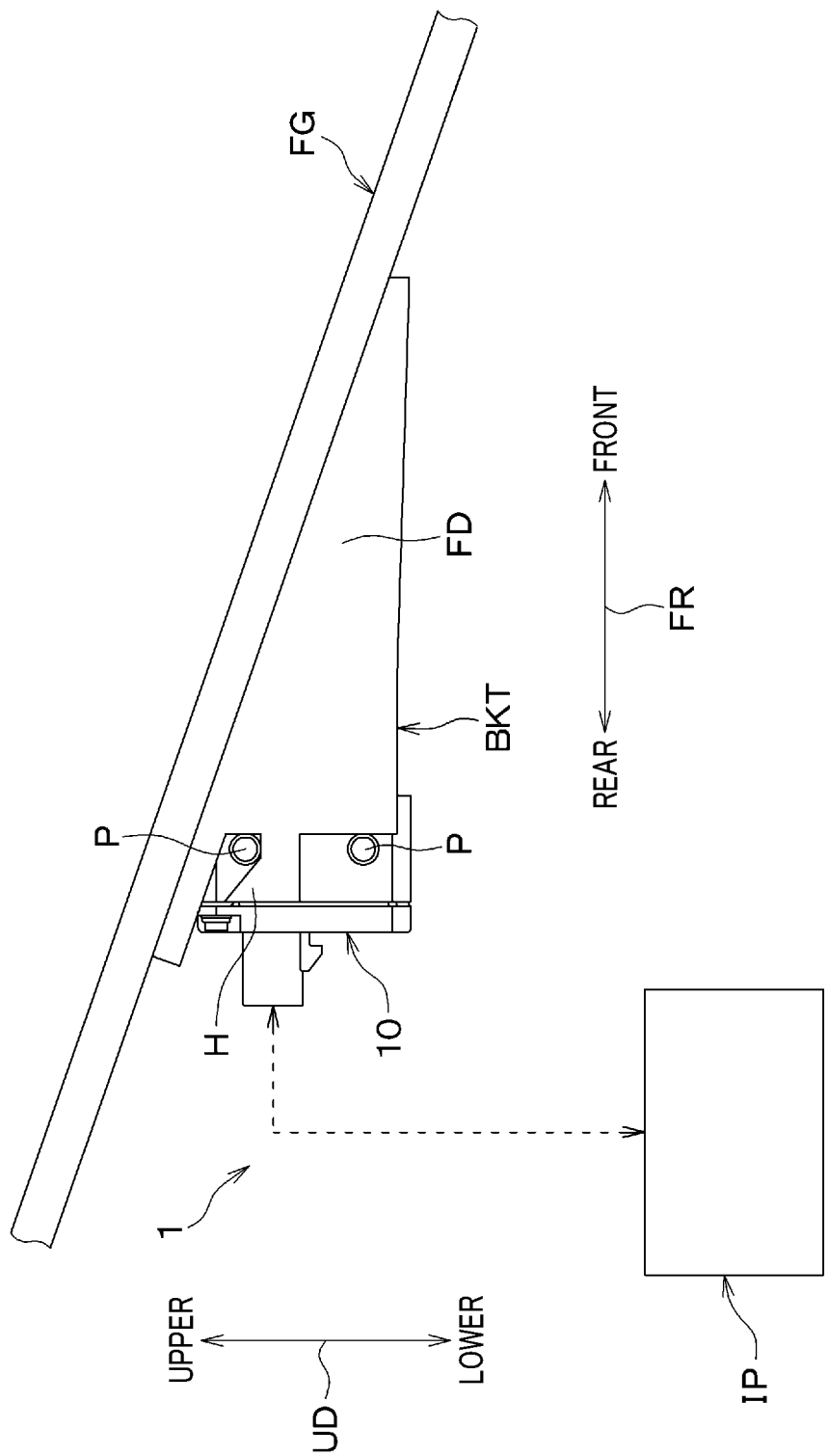
FIG. 1 is a schematic side view of an imaging apparatus installed in a vehicle according to the first embodiment of the present disclosure.

The following describes exemplary embodiments of the present disclosure with reference to the accompanying drawings.

Descriptions of components described in one or more latter embodiments, which are identical or equivalent to those described in a former embodiment, may be omitted while, to each pair of the identical or equivalent components, a corresponding unique reference character is assigned.

If specifically selected components are only described in one or more latter embodiments, descriptions of the remaining components, which have been shown in a former embodiment, can be employed. The following embodiments can be at least partly combined with each other without inconsistences even if there are no specific expressions about the at least partial combination.

First Embodiment

The following describes the first embodiment with reference to FIGS. 1 to 8.

Referring to FIG. 1, an imaging apparatus 1 according to the first embodiment is installed in a vehicle V, and can be configured to capture images of the surroundings of the vehicle V.

In FIG. 1 or another figure, a first arrow represents a height direction, i.e., an up-down direction, of the imaging apparatus 1 installed in the vehicle V; reference character UD is assigned to the first arrow. In FIG. 1, the imaging apparatus 1 is installed in the vehicle V in which the height direction UD is in alignment with the vertical direction of the vehicle V.

Similarly, in FIG. 1 or another figure, second arrow represents a front/rear direction, i.e., a forward/rearward direction, of the vehicle V in which the imaging apparatus 1 is installed; reference character FR is assigned to the second arrow. Additionally, a third second arrow represents a horizontal direction, i.e., a left-right direction, of the imaging apparatus 1; the left-right direction is in alignment with a width direction of the vehicle V. Reference character LR is assigned to the third arrow.

That is, the imaging apparatus 1 is installed in the vehicle V in which the height direction of the imaging apparatus 1 is always perpendicular to the left-right direction, i.e., vehicle width direction, LR.

The imaging apparatus 1 includes a camera module 10, a pair of left and right brackets BKT, a hood FD, and an image processing apparatus IP. As illustrated in FIG. 1, the camera module 10 and the image processing apparatus IP are respectively configured as individual members.

The camera module 10 is configured as an assembly comprised of (i) a lens barrel 20 that includes at least one lens LS, (ii) a circuit module CM including a circuit board 30 and an imager 31, and (iii) a case 50. The lens barrel 20 and the circuit board 30 are mounted to the case 50. The case 50 has, for example, a substantially rectangular- or square-parallelepiped shape, and has front and rear walls in the front/rear direction FR, left and right walls in the left-right direction LR, and top and bottom walls in the height direction UD.

The camera module 10 has, for example, a predetermined diagonal angle of view that defines a predetermined field of view.

Figure 2:
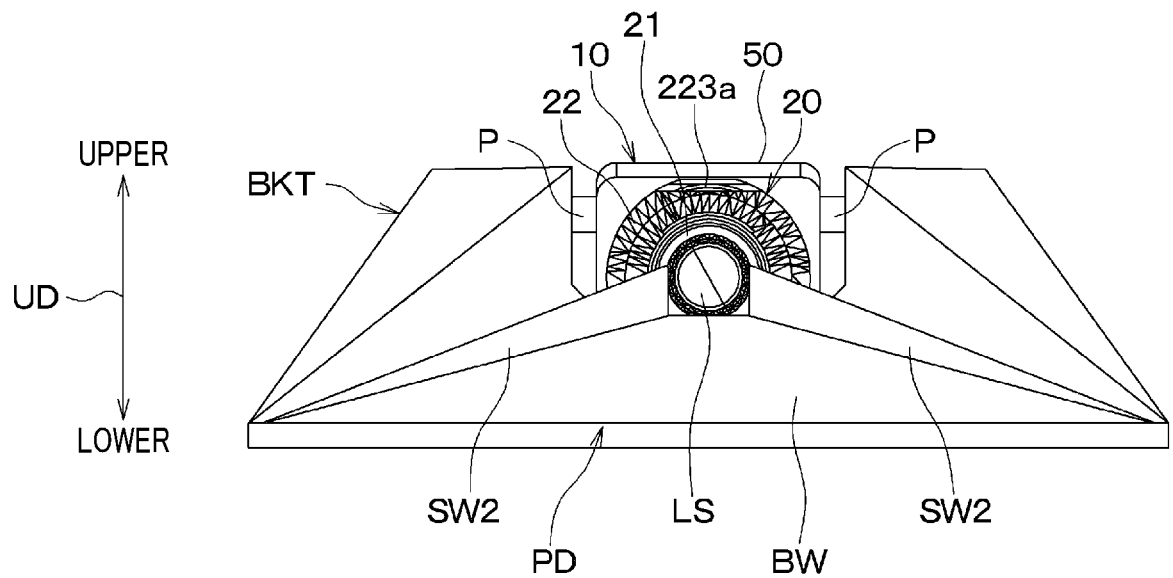
FIG. 2 is a schematic front elevational view of a camera module included in the imaging apparatus.

As illustrated in FIGS. 1 and 2, the camera module 10 includes attachment pins P, especially, three attachment pins P, each of which has a substantially columnar shape. The two attachment pins P are respectively mounted to upper and lower portions of an outer surface of the right wall while extending outwardly from the outer surface of the right wall. The remaining one attachment pin P is mounted to an upper portion of an outer surface of the left wall while extending outwardly from the outer surface of the left wall.

Each bracket BKT, which is secured to the front windshield FG of the vehicle V, is arranged to locate the camera module 10 to be adjacent to the front windshield FG.

Each of the left and right brackets BKT has, for example, a substantially L shape, and is comprised of a sidewall having, for example, a substantially triangular shape, and located to face the outer surface of the corresponding one of the left and right walls of the case 50 of the camera module 10.

Each of the left and right brackets BKT is also comprised of a top wall extending outwardly from an upper end of the sidewall of the corresponding one of the left and right brackets BKT.

Each bracket BKT is, for example, arranged such that an outer surface of the corresponding top wall thereof is mounted on an inner surface of the windshield FG. In particular, the sidewalls of the respective left and right brackets BKT are arranged to face one another while extending toward the front direction as their interval become wider (see FIG. 2).

Each of the left and right brackets BKT is further comprised of a hook H having a substantially L shape. The hook H of each bracket BKT is configured to protrude from a rear outer surface of the corresponding sidewall toward the rear direction.

Specifically, the hook H of the left bracket BKT is arranged such that the attachment pin P of the camera module 10, which extends outwardly from the upper portion of the outer surface of the left wall of the case 50, is caught in the hook H of the left bracket BKT. Similarly, the hook H of the right bracket BKT is arranged such that the attachment pin P of the camera module 10, which extends outwardly from the upper portion of the outer surface of the right wall of the case 50, is caught in the hook H of the right bracket BKT. This enables the camera module 10 to be arranged adjacently to the front windshield FG.

The hood FD serves as a member for reducing entrance of light into the camera module 10 from regions located outside the predetermined field of view defined by the predetermined diagonal angle of view of the camera module 10. For example, the hood FD is made of black resin.

Specifically, referring to FIG. 2, the hood FD is comprised of a bottom wall BW, and a pair of left and right sidewalls SW1 and SW2.

The bottom wall BW has a substantially trapezoidal prism whose top and bottom surfaces have a substantially isosceles trapezoidal shape. That is, the bottom wall BW has first and second parallel sides, and the front wall of the camera module 10 is located adjacent to the first parallel side of the bottom wall BW, so that the lens barrel 20 of the camera module 10 is located above the bottom wall BW of the hood FD.

The bottom wall BW also has two left and right sides whose interval becomes wider from the first parallel side to the second parallel side thereof.

The left and right sidewalls SW1 and SW2 are mounted to the respective left and right sides of the bottom wall BW, and extend in the height direction UD. The left and right brackets BKT are located adjacently to the respective outer surfaces of the left and right sidewalls SW1 and SW2.

Specifically, the hood FD can be fixedly mounted to at least one of the camera module 10 and each bracket BKT to cover the lens barrel 20 from its lower side. The arrangement of the food FD with respect to the camera module 10 can prevent light reflected by the dashboard of the vehicle V from entering the camera module 10.

The image processing apparatus IP is operative to perform variable tasks based on analog and/or digital signals of images captured by and outputted from the camera module 10. For example, the image processing apparatus IP is comprised of a microcomputer including, for example, one or more processors and one or more memories.

The image processing apparatus IP is configured to perform, for example, a recognition task, a target route creating task, and a vehicle drive control task.

The recognition task is designed to recognize, based on the analog and/or digital signals of images captured by and outputted from the camera module 10, various traffic objects, such as traffic lanes, road configurations, obstacles, and/or traffic signs. The target route creating task is designed to create, based on the recognized traffic objects, at least one target route from the location of a specified start point to the location of a travel destination. The vehicle drive control task is designed to control, based on the recognized traffic objects, how to drive the vehicle V in order to safely travel the vehicle V.

The image processing apparatus IP is communicatively connected to the camera module 10 by wire or radio.

Next, the following describes the camera module 10.

Figure 3:
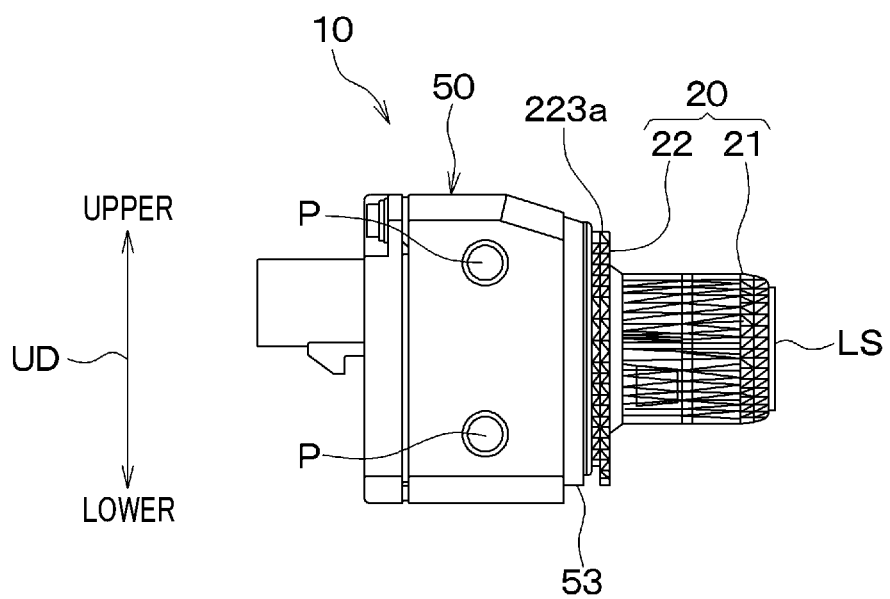
FIG. 3 is a schematic side view of the camera module.
Figure 4:
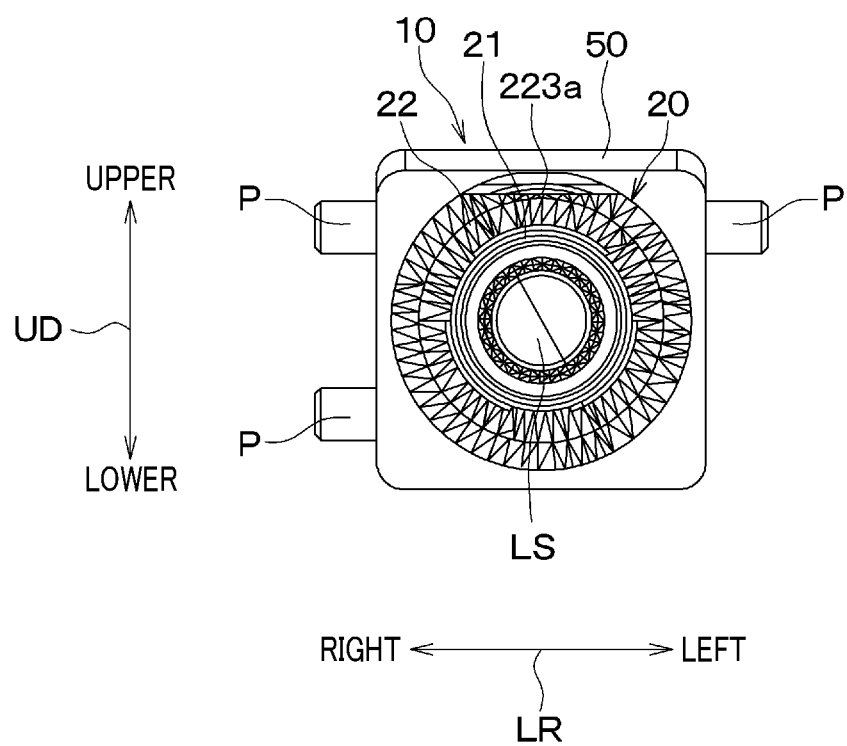
FIG. 4 is a schematic front elevational view of the camera module.
Figure 5:
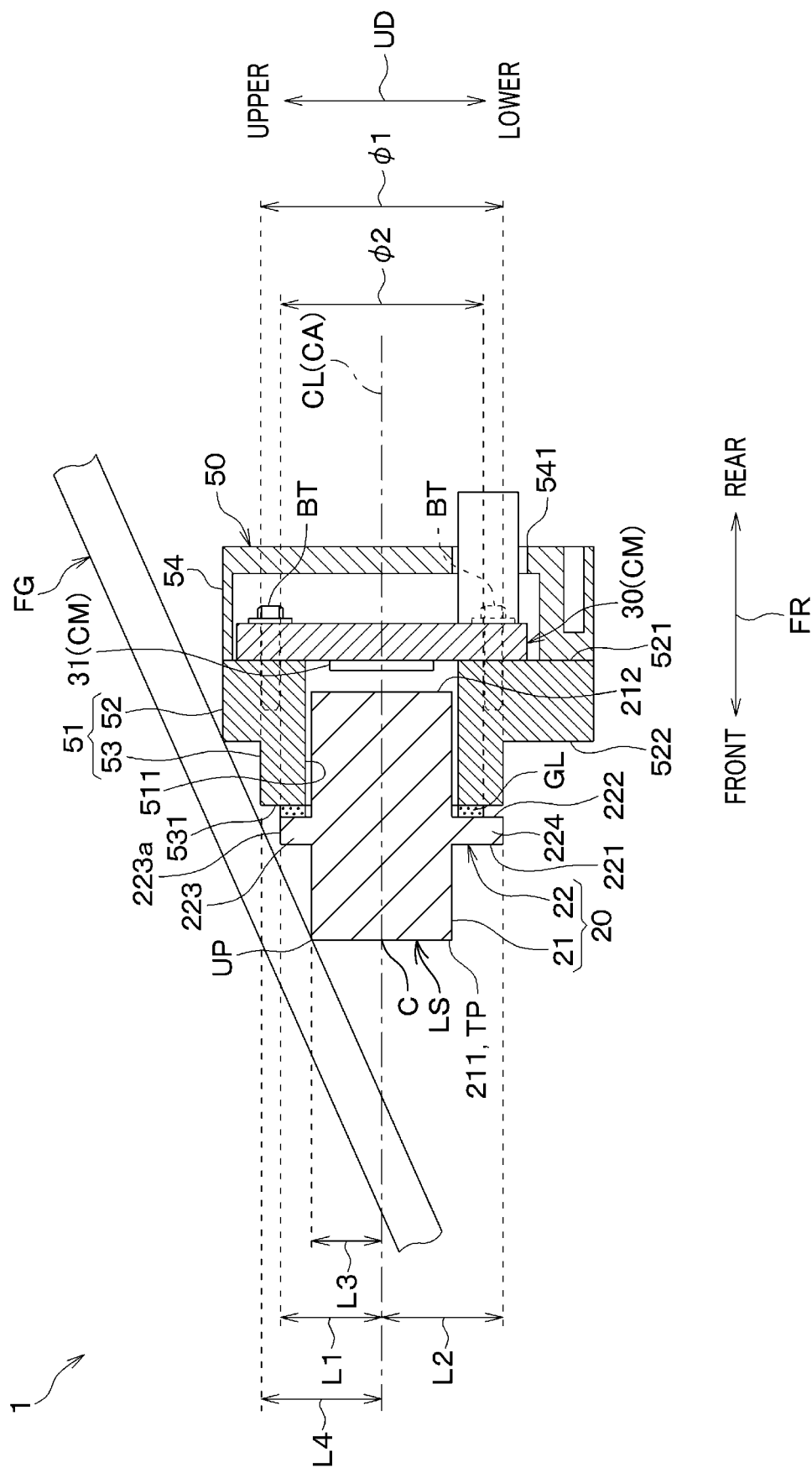
FIG. 5 is a schematic longitudinal cross-sectional view of the camera module while the camera module is installed in the vehicle.

As illustrated in FIGS. 3 to 5, the camera module 10 is configured as the assembly comprised of the lens barrel 20 that includes the at least one lens LS, the circuit board 30 to which the imager 31 is mounted, and the case 50 that holds the circuit board 30. The camera module 10 is designed as a fixed-focus camera module having a predetermined constant distance, which will also be referred to as an imager distance, between the at least one lens LS and the imager 31. Additionally, as illustrated in FIGS. 3 and 4, the camera module 10 is designed as a monocular camera module.

As described above, the left and right bracket BKT enable the lens barrel 20 of the camera module 10 to be located adjacently to the front windshield FG.

The lens barrel 20 is comprised of, for example, the at least one lens LS, a barrel body 21 in which the at least one lens LS is installed, and a flange 22. The barrel body 21 has a substantially cylindrical tubular shape, and the flange 22 protrudes outwardly, i.e., radially, from an outer peripheral surface, i.e., an outer surface, of the barrel body 21. Each of the barrel body 21 and the flange 22 is made of, for example, resin material, such as PPS (Polyphenylene Sulfide) resin. The barrel body 21 and the flange 22 can be integrally molded to constitute an integral molded product.

The lens barrel 20 has a center axis CL, and the barrel body 21 has an inner peripheral wall that defines a through hole formed thereinside. The at least one lens LS, which has a center axis, i.e., an optical axis, CA, is arranged in the through hole of the barrel body 21 and secured to the inner peripheral wall of the barrel body 21 such that the optical axis CA of the at least one lens LS is coincident with the center axis CL of the lens barrel 20. The center axis CL of the lens barrel 20 is defined as a center axis of the tubular cylindrical portion of the barrel body 21, which includes the inner peripheral wall of the barrel body 21. The outer peripheral surface of the barrel body 21 is arranged around the optical axis CA of the at least one lens LS.

As illustrated in FIG. 5, the imaging apparatus 1 is installed in the vehicle V while the height direction UD is defined to be perpendicular to the left-right direction (vehicle width direction) LR and the optical axis CA of the at least one lens LS.

Note that, in FIG. 5, the assembly of the at least one lens LS and the lens barrel 20 is integrally hatched for the sake of illustration of the assembly of the at least one lens LS and the lens barrel 20. The same goes for FIGS. 8A to 8C, 9 to 11A, and 13.

The flange 22 serves as a protrusion member that protrudes, from the outer peripheral surface of the barrel body 21, toward a direction away from the center axis CA of the at least one lens LS. The flange 22 according to the first embodiment has a substantially annular shape that radially extends from the outer peripheral surface of the barrel body 21.

Specifically, the barrel body 21 has a front end 211 and a rear end 212, and the flange 22 is located between the front end 211 and rear end 212 of the barrel body 21. The flange 22 has a front-end surface 221 and a rear-end surface 222. The front-end surface 221 of the flange 22 is located to face the front windshield FG, and the rear-end surface 222 of the flange 22 is located to face the case 50. The rear-end surface 222 of the flange 22 is adhered to the front wall of the case 50 with an adhesive GL, resulting in the lens barrel 20 being secured to the case 50.

The lens barrel 20 is comprised of a rear part situated at the rear of the flange 22, and a front part including the flange 22 and situated at the front of the flange 22. The rear part of the lens barrel 20 is accommodated in the case 50, and the front part of the lens barrel 20 is exposed from the case 50.

The circuit board 30 has opposing first and second major surfaces. A wiring pattern is mounted on at least the first major surface of the circuit board 30. On the first major surface of the circuit board 30, the imager 31 and other various electronic and/or electric devices are mounted. The circuit board 30 is arranged such that the first major surface faces the at least one lens LS. The circuit board 30 is fastened to the case 50 with bolts BT.

The imager 31 is comprised of, for example, a semiconductor-based imaging device, such as a CCD image sensor or a CMOS image sensor. The imager 31 has a light-receiving surface, and is configured to convert a light image of a front view focused by the at least one lens LS on the light receiving surface of the imager 31 into an electrical image to accordingly output analog and/or digital signals of the converted electrical image to the image processing apparatus IP. The imager 31 is, for example, soldered to the circuit board 30. Specifically, the imager 31 is arranged to face the at least one lens LS such that light passing through the at least one lens LS enters the light receiving surface of the imager 31.

Referring to FIGS. 3 and 4, the case 50 has, as described above, a substantially rectangular- or square-parallelepiped shape, and is made of metal or resin. As described above, the two attachment pins P are respectively mounted to the upper and lower portions of the outer surface of the right wall of the case 50 while extending outwardly from the outer surface of the right wall. The remaining one attachment pin P is mounted to the upper portion of the outer surface of the left wall of the case 50 while extending outwardly from the outer surface of the left wall. As described above, the hook H of the left bracket BKT is arranged such that the attachment pin P of the camera module 10, which extends outwardly from the upper portion of the outer surface of the left wall of the case 50, is caught in the hook H of the left bracket BKT. Similarly, the hook H of the right bracket BKT is arranged such that the attachment pin P of the camera module 10, which extends outwardly from the upper portion of the outer surface of the right wall of the case 50, is caught in the hook H of the right bracket BKT.

Referring to FIG. 5, the case 50 is comprised of a base 51 and a cover member 54 joined to the base 51.

The base 51 is designed as an integral assembly comprised of a substantially rectangular or square-parallelepiped block member 52 and a substantially cylindrical tubular member 53. The base 51 has a through hole 511 formed therethrough, that is, formed through the block member 52 and the cylindrical tubular member 53.

The block member 52 has an inner end surface 521 joined to the cover member 54, and an outer end surface 522 opposite to the inner end surface 521. The circuit board 30 is mounted at its first major surface on the inner end surface 521 of the block member 52 such that the imager 31 is located inside the through hole 511.

The cylindrical tubular member 53 is comprised of a base portion located in the block member 52, and a projecting portion projecting away from the outer end surface 522 of the block member 52. The projecting portion and a part of the base portion of the cylindrical tubular member 53 surround the outer peripheral surface of the rear part of the lens barrel 20.

The cylindrical tubular member 53 has a front-end surface 531 located to face the rear-end surface 222 of the flange 22 with a predetermined clearance between the front-end surface 531 and the rear-end surface 222. The front-end surface 531 of the cylindrical tubular member 53 serves as a facing surface that faces the flange 22 with the predetermined clearance.

The cover member 54 is joined to the base 51 with one or more unillustrated fastening members. The cover member 54 has an outline configuration that is in conformity with the outline configuration of the block member 52 of the base 51. Specifically, the cover member 54 and the inner end surface 521 of the block member 52 define an inner chamber therebetween, and the inner chamber communicates with the through hole 511 of the base 51. That is, the inner chamber defined between the cover member 54 and the inner end surface 521 of the block member 52 serves as an installation chamber in which the circuit board 30 is installed. The cover member 54 has a rear end wall that has an opening 541 formed therein; the opening 541 of the rear end wall of the cover member 54 enables one or more communication cables to be externally drawn out therethrough from the circuit board 30.

The adhesive GL, which has been applied to the front-end surface 531 of the cylindrical tubular member 53 during manufacturing of the camera module 10, causes the rear-end surface 222 of the flange 22 to be adhered to the front-end surface 531 of the cylindrical tubular member 53, resulting in the lens barrel 20 being secured to the case 50. A thermo-setting adhesive is used as the adhesive GL according to the first embodiment. One of other types of adhesives can be used as the adhesive GL.

Let us assume that a typical imaging apparatus has a substantially identical configuration of the imaging apparatus 1 except that the camera module has a known configuration. For the typical imaging apparatus, it is desired to arrange the camera module to be adjacently as possible to the front windshield FG of the vehicle V. The flange of the lens barrel of the typical imaging apparatus, which is needed for attachment of the barrel body to the case, may make it difficult to arrange the barrel body of the lens barrel as adjacently as possible to the front windshield FG.

In addition, user's request level for the adhesive positioning accuracy of the barrel body relative to the case of the typical imaging apparatus has been increasing over time. The adhesive dispensed between the flange of the lens barrel and the case shrinks while being cured. The cure shrinkage of the adhesive may impact the adhesive positioning accuracy of the barrel body relative to the case, resulting in a decrease in an imaging accuracy of the typical imaging apparatus.

In view of the above circumstances, the imaging apparatus 1 according to the first embodiment includes the camera module 10 that has a specific configuration different from the configuration of the camera module of the typical imaging apparatus.

Figure 6:
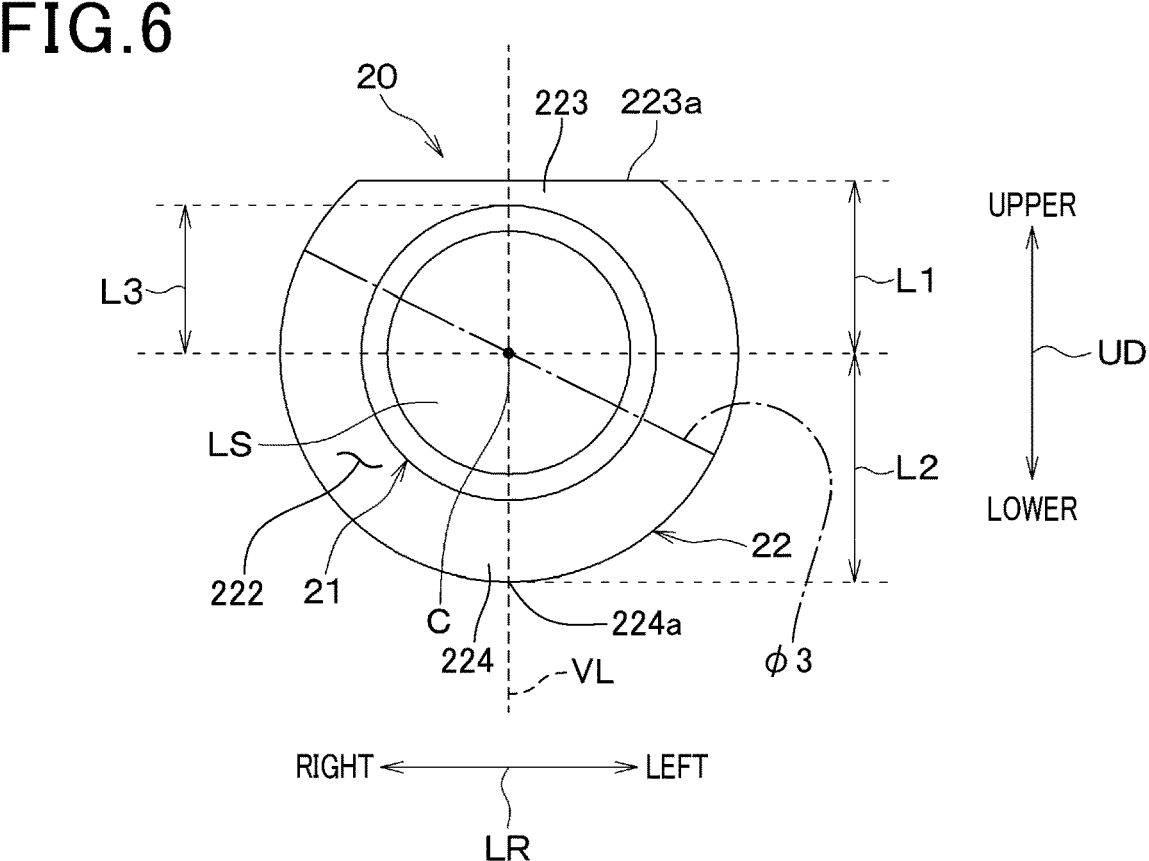
FIG. 6 is a schematic front elevational view of a lens barrel of the camera module in which at least one lens is installed.
Figure 7:
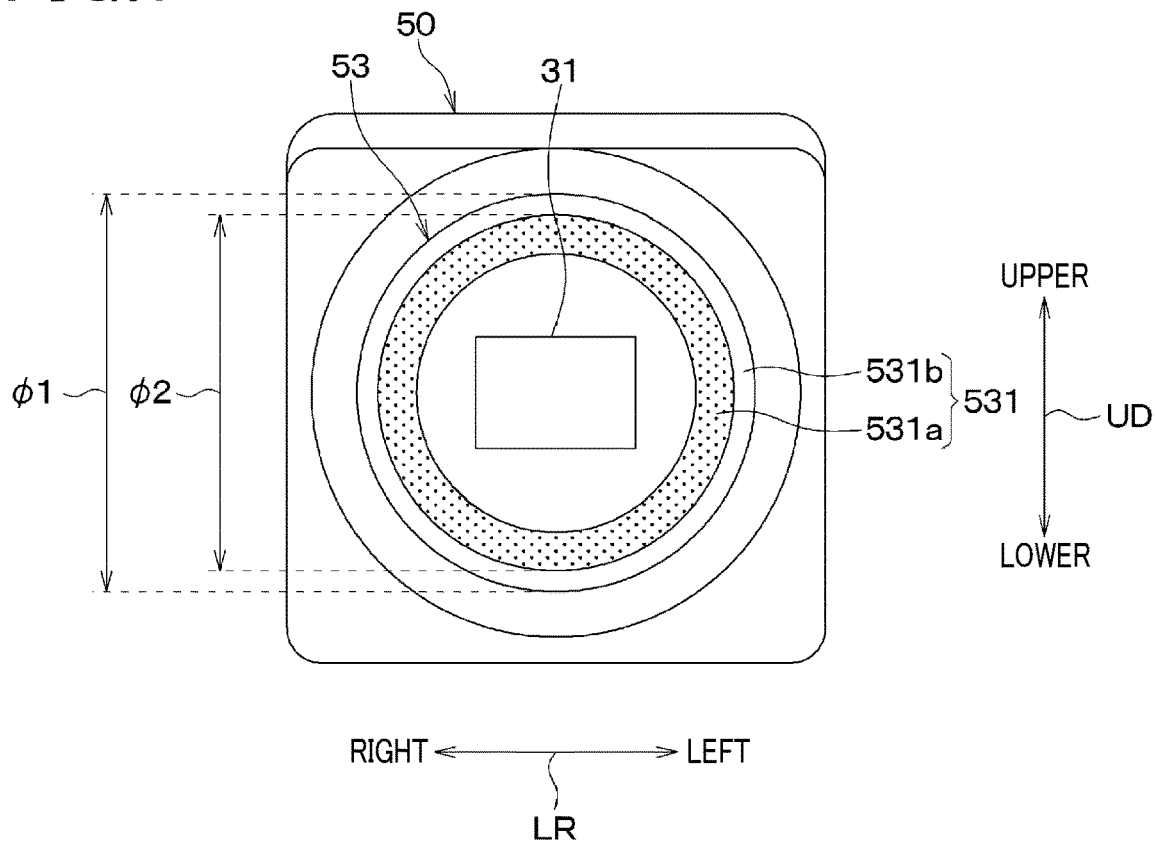
FIG. 7 is a schematic front elevational view of a case of the camera module.
Figure 8:
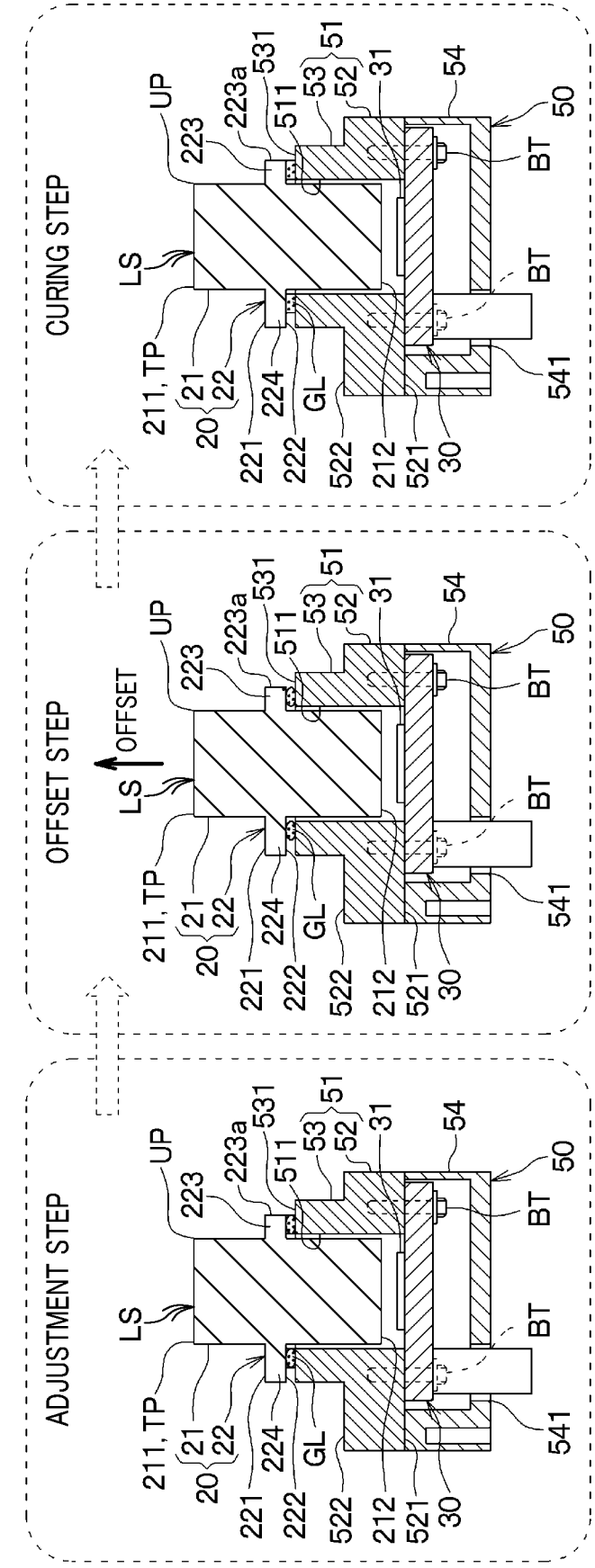
FIGS. 8A to 8C are a joint view schematically illustrating an adhesive assembling process during manufacturing of the camera module.

The following describes the specific configuration of the camera module 10 with reference to FIGS. 5, 6, and 7.

Referring to FIG. 6, the flange 22 of the lens barrel 20 has a substantially D shape outline in its lateral cross section perpendicular to the center axis CL of the lens barrel 20; the D-shaped outline of the flange 22 has a circular segment arc and a liner segment when viewed in a direction parallel to the center axis CL of the lens barrel 20. The D-shaped outline of the flange 22 enables the flange 22 to be less likely to interfere with the front windshield FG.

Specifically, the flange 22 is comprised of an upper portion 223 and a lower portion 224. The upper portion 223 is located above the center axis CL of the lens barrel 20 in the height direction UD; the center axis CL of the lens barrel 20 corresponds to the optical axis CA of the at least one lens LS. The lower portion 224 is located below the center axis CL of the lens barrel 20 in the height direction UD.

The upper portion 223 of the flange 22 has an upper end, i.e., an uppermost end, 223a in the height direction UD. The uppermost end 223a according to the first embodiment is configured as a substantially flat surface extending in the left-right direction LR. The lower portion 224 has a lower end, i.e., a lowermost end, 224a in the height direction UD; the lowermost end 224a is aligned in a vertical line VL passing through the center axis CL of the lens barrel 20; the vertical line VL is parallel to the height direction UD. A minimum distance from the uppermost end 223a of the upper portion 223 to the center axis CL of the lens barrel 20 is expressed as L1, and a minimum distance from the lowermost end 224a of the lower portion 224 to the center axis CL of the lens barrel 20 is expressed as L2. At that time, the flange 22 is configured such that the distance L1 is smaller than the distance L2, which is represented as L1<L2.

The front end 211 of the barrel body 21 of the lens barrel 20 while the lens barrel 20 is installed in the vehicle V is located forwardmost in the lens barrel 20. The front end 211, to which reference character TP is assigned, has an upper end UP, and the upper end UP of the front end 211 of the barrel body 21 is located below the uppermost end 223a of the upper portion 223 of the flange 22 in the height direction UD. Specifically, a minimum distance L3 from the upper end UP of the front end 211 of the barrel body 21 in the height direction UD is expressed as L3. The flange 22 is configured such that the minimum distance L1 is greater than the minimum distance L3, which is represented as L1>L3.

Additionally, the uppermost end 223a of the upper portion 223 of the flange 22 is, as illustrated in FIG. 5, located below an uppermost end of the front-end surface 531 of the cylindrical tubular member 53 in the height direction UD. Specifically, a minimum distance from the center axis CL of the lens barrel 20 to the uppermost end of the front-end surface in the height direction UD is expressed as L4. The flange 22 is configured such that the minimum distance L1 is smaller than the minimum distance L4, which is represented as L1<L4.

For example, cutting an upper portion of a ring-shaped flange can create the flange 22 specially configured set forth above. Alternatively, the flange 22 can be molded using a prepared mold having a D-shaped cavity formed thereinside.

As illustrated in FIG. 7, the front-end surface 531 of the cylindrical tubular member 53 has a substantially annular shape. In particular, the front-end surface 531 has an annular inner section 531a (see dotted part in FIG. 7) to which the adhesive GL has been applied during manufacturing of the camera module 10. The front-end surface 531 also has an annular outer section 531b to which no adhesive is applied during manufacturing of the camera module 10.

Specifically, as illustrated in FIG. 5, an outer edge of the front-end surface 531 has a diameter φ1, and the annular inner section 531a to which the adhesive GL has been applied has a diameter φ2; the diameter φ1 is greater than the diameter φ2.

The rear-end surface 222 of the flange 22 has a center C defined as a point passing through the center axis CL of the lens barrel 20, and also has a diameter φ3, which is defined as the length of a straight line passing through the center C and connecting two points on the outline of the rear-end surface 222 except for the uppermost end 223a. The diameter φ3 is set to be greater than the diameter φ2 of the annular inner section 531a to which the adhesive GL has been applied. The diameter φ3 can be set to be equal to or different from the diameter φ1 of the outer edge of the front-end surface 531.

The uppermost end 223a of the rear-end surface 222 has a diameter, which is defined as (2×L1), and the diameter (2×L1) of the uppermost end 223a of the rear-end surface 222 can be set to equal to or different from the diameter φ2 of the annular inner section 531a to which the adhesive GL has been applied.

That is, as illustrated in FIG. 7, the front-end surface 531 of the cylindrical tubular member 53 has the annular inner section 531a serving as an adhesive section 531a that faces the rear-end surface 222 of the flange 22 via the adhesive GL, and the annular outer section 531b serving as a non-adhesive section 531b that surrounds the annular inner section 531a and faces the rear-end surface 222 of the flange 22 without intervention of the adhesive GL between the annular outer section 531b and the rear-end surface 222 of the flange 22.

Next, the following describes an adhesive assembling process of adhesively assembling the lens barrel 20 to the case 50 during manufacturing of the imaging apparatus 1 with reference to FIGS. 8A to 8C.

The adhesive assembling process includes an application step, an adjustment step (see FIG. 8A), an offset step (see FIG. 8B), and a curing step (see FIG. 8C), which are carried out in this order.

The application step is a step of applying an uncured adhesive GL to the annular inner section 531a of the front-end surface 531 of the cylindrical tubular member 53 of the case 50.

The adjustment step is a step of adjusting a relative position of the circuit board 30 relative to the lens barrel 20. Specifically, the adjustment step adjusts the relative position of the circuit board 30 relative to the lens barrel 20 while a part of the lens barrel 20 has been inserted inside the cylindrical tubular member 53 of the case 50.

Specifically, the adjustment step adjusts the imager distance between the at least one lens LS and the imager 31. In addition, if the angle of tilt of the light receiving surface of the imager 31 with respect to the optical axis CA of the at least one lens LS were deviated from a 90-degree angle so that the light receiving surface of the imager 31 were inclined with respect to a direction parallel to a principal plane of the at least one lens LS, a one-side blur might appear in some images captured by the imager 31, resulting in the quality of the images deteriorating.

From this viewpoint, the adjustment step additionally includes a step of, while adjusting the imager distance, positioning the case 50 and the lens barrel 20 such that (i) the optical axis CA of the at least one lens LS passes through the center of the light receiving surface of the imager 31, and (ii) the optical axis CA of the at least one lens LS is perpendicular to the light receiving surface of the imager 31.

That is, the adjustment step locates, with the adhesive GL being uncured, the circuit board 30 at an adjusted reference position relative to the lens barrel 20, which enables the at least one lens LS being in focus with the imager 31.

The uncured adhesive GL interposed between the case 20 and the flange 22 of the lens barrel 20 has a given thickness in the optical axis CA of the at least one lens LS.

For this reason, if the curing step, which cures the uncured adhesive GL with the at least one lens LS in focus with the imager 31, were carried out subsequently to the adjustment step, the uncured adhesive GL would shrink while being cured. The cure shrinkage of the uncured adhesive GL would cause change of the imager distance, resulting in the at least one lens LS being out of focus with the imager 31. Additionally, due to variations in the thickness of the uncured adhesive GL in the circumferential direction of the lens barrel 20, the cure shrinkage of the uncured adhesive GL might cause the angle of tilt of the light receiving surface of the imager 31 with respect to the optical axis CA to deviate from the 90-degreee angle. This might cause a one-side blur in some images captured by the imager 31.

From this viewpoint, the adhesive assembling process according to the first embodiment carries out the offset step, which offsets the adjusted reference position of the circuit board 30 relative to the lens barrel 20 in the optical axis CA of the at least one lens LS in consideration of the cure shrinkage of the uncured adhesive GL.

Specifically, the offset step estimates the amount of cure shrinkage of the uncured adhesive GL based on the thickness of the uncured adhesive GL in the optical axis CA of the at least one lens LS. Then, the offset step offsets, based on the estimated amount of cure shrinkage of the uncured adhesive GL, the adjusted reference position of the circuit board 30 relative to the lens barrel 20 in the optical axis CA of the at least one lens LS. That is, the offset step expands, based on the estimated amount of cure shrinkage of the uncured adhesive GL, the adjusted imager distance defined by the adjusted reference position of the circuit board 30 relative to the lens barrel 20 in the optical axis CA of the at least one lens LS.

An uncured adhesive usually has a substantially constant rate of cure shrinkage that depends on the material(s) of the uncured adhesive. For this reason, a known thickness of an uncured adhesive enables the amount of cure shrinkage of the uncured adhesive to be determined. However, because an uncured adhesive has an indefinite shape, it would be difficult to directly measure the thickness of the uncured adhesive.

In contrast, the camera module 10 according to the first embodiment is specially configured to enable measurement of an equivalent of the thickness of the uncured adhesive GL.

Specifically, the camera module 10 of the first embodiment is configured such that (1) The diameter ϕ1 of the outer edge of the front-end surface 531 of the cylindrical tubular member 53 is greater than the diameter ϕ2 of the annular inner section 531a to which the adhesive GL has been applied (2) The diameter ϕ3, which is defined as the length of the straight line passing through the center C and connecting two points on the outline of the rear-end surface 222 except for the uppermost end 223a, is greater than the diameter ϕ2 of the annular inner section 531a to which the adhesive GL has been applied This enables a minimum distance between (i) the annular outer section 531b of the front-end surface 531 of the cylindrical tubular member 53 to which no adhesive is applied and (ii) the rear end surface 223 of the flange 22 in the optical axis CA of the at least one lens LS to be determined as an equivalent of the thickness of the uncured adhesive GL. This therefore enables the amount of cure shrinkage of the uncured adhesive GL to be obtained based on the measured equivalent of the thickness of the uncured adhesive GL with higher accuracy.

Following the offset step, the adhesive assembling process carries out the curing step of curing the uncured adhesive GL. Because the first embodiment uses a thermo-setting adhesive as the adhesive GL, the curing step irradiates the adhesive GL with laser light or ultraviolet rays to accordingly heat the adhesive GL, thus curing the adhesive GL. This results in the lens barrel 20 being adhesively secured to the case 50.

The imaging apparatus 1 described above includes the cylindrical tubular member 53 of the case 50, and the front-end surface 531 of the cylindrical tubular member 53 has the adhesive section 531a that faces the rear-end surface 222 of the flange 22 via the adhesive GL, and has the non-adhesive section 531b that surrounds the adhesive section 531a and faces the rear-end surface 222 of the flange 22 without intervention of the adhesive GL between the non-adhesive section 531b and the rear-end surface 222 of the flange 22

Measurement of the interval between the non-adhesive section 531b of the front-end surface 531 and the rear-end surface 222 of the flange 22 in the optical axis CA of the at least one lens LS enables measurement of an equivalent of the thickness of the uncured adhesive GL. This therefore enables the amount of cure shrinkage of the uncured adhesive GL to be obtained based on the measured equivalent of the thickness of the uncured adhesive GL, making it possible to locate the circuit board 30 at a position offset, by a distance based on the measured amount of cure shrinkage of the uncured adhesive GL, from the adjusted reference position for the circuit board 30 in the optical axis CA of the at least one lens LS. In other words, this makes it possible to adjust, based on the measured amount of cure shrinkage of the uncured adhesive GL, the relative positional relationship between the lens barrel 20 and the case 50 in the optical axis CA of the at least one lens LS.

This therefore holds a reduction in an imaging accuracy of the imaging apparatus 1 due to shrinkage of the uncured adhesive GL to a minimum.

In addition, the flange 22 of the lens barrel 20 of the camera module 10 according to the first embodiment is comprised of the upper portion 223 and the lower portion 224. The upper portion 223 is located above the center axis CL of the lens barrel 20 in the height direction UD, and the lower portion 224 is located below the center axis CL of the lens barrel 20 in the height direction UD.

The upper portion 223 of the flange 22 has the uppermost end 223a that extends in a direction parallel to the left-right direction LR, and has the lowermost end 224a that is aligned in the vertical line VL passing through the center axis CL of the lens barrel 20; the vertical line VL is parallel to the height direction UD. The minimum distance L1 from the uppermost end 223a of the upper portion 223 to the center axis CL of the lens barrel 20 is smaller than the minimum distance L2 from the lowermost end 224a of the lower portion 224 to the center axis CL of the lens barrel 20.

This makes it possible to arrange the imaging apparatus 1 as adjacently as possible to the front windshield FG while enabling the flange 22, i.e., the lens barrel 20, to be less likely to interfere with the front windshield FG.

As illustrated in FIG. 5, the front windshield FG is inclined upwardly with respect to, for example, the center axis CL of the lens barrel 20, i.e., the forward/rearward direction FR. In conformity with the upwardly inclined front windshield FG, the uppermost end 223a of the upper portion 223 of the flange 22 is located to be lower than the uppermost end of the front-end surface 531 of the cylindrical tubular member 53 in the height direction UD. This enables the camera module 10 to be likely to be located adjacently to the front windshield FG.

The front end 211 (TP) of the barrel body 21 has the upper end UP, and the upper end UP of the front end 211 of the barrel body 21 is located to be lower than the uppermost end 223a of the upper portion 223 of the flange 22 in the height direction. This also enables the camera module 10 to be likely to be located adjacently to the front windshield FG.

Second Embodiment

Figure 9:
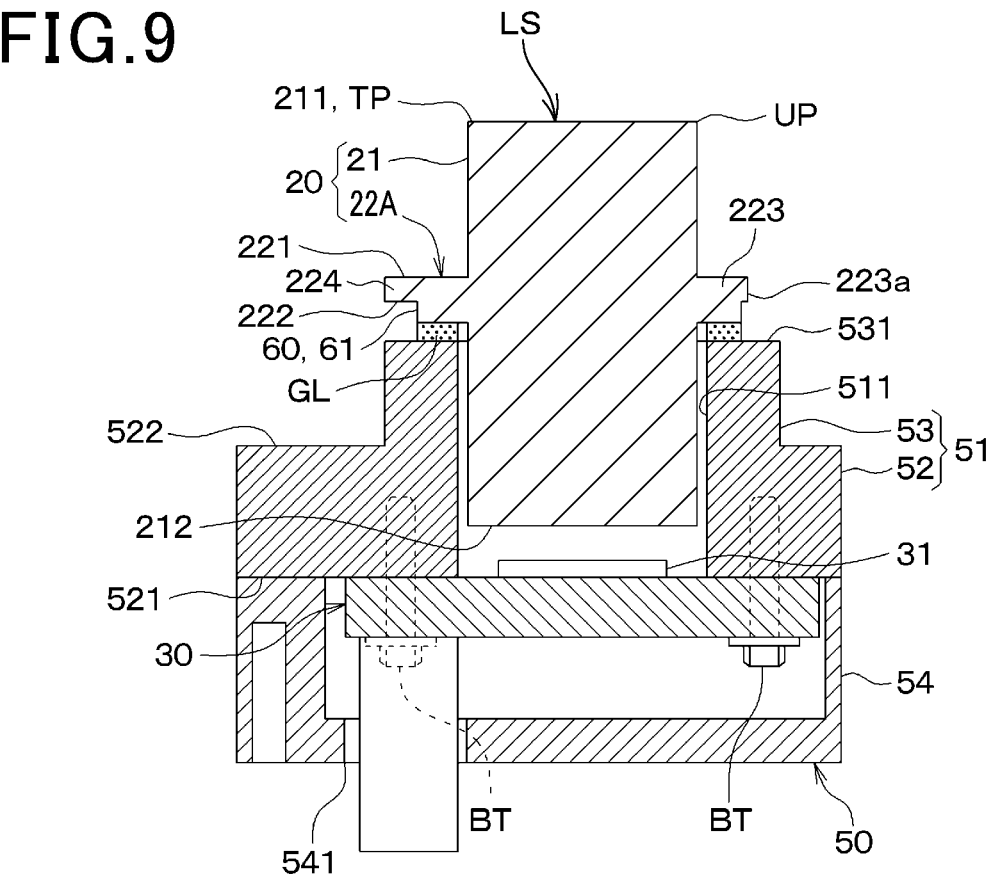
FIG. 9 is a schematic longitudinal cross-sectional view of a camera module included in an imaging apparatus according to the second embodiment of the present disclosure.

The following describes an imaging apparatus according to the second embodiment of the present disclosure with reference to FIG. 9. The structure and/or functions of the imaging apparatus according to the second embodiment are mainly identical to those of the imaging apparatus 1 except for the following points. The following therefore describes mainly the different points.

The lens barrel 20 according to the second embodiment is made of, for example, resin material, and at least a flange 22A of the lens barrel 20 has been surface-treated with, for example, plasma or ultraviolet rays. The surface-treated flange 22A of the lens barrel 20 results in an increase in the wettability of the whole external surface of the flange 22A. This might cause the uncured adhesive GL to be likely to seep toward a space defined between the non-adhesive section 531b of the front-end surface 531 and a corresponding outer part of the rear end surface 222 of the flange 22A, which faces the non-adhesive section 531b.

From this viewpoint, the lens barrel 20 includes a limit member 60 provided for the flange 22A and configured to limit the seepage of the uncured adhesive GL. The limit member 60 can be integrally molded together with the flange 22A.

Specifically, as illustrated in FIG. 9, the flange 22A has formed in an outer part of the rear end surface 222 of the flange 22A, which faces the non-adhesive section 531b, an annular shoulder recess 61 as the limit member 60. The annular shoulder recess 61 has an annular inner edge aligned with the boundary between the adhesive section 531a and the non-adhesive section 531b of the front-end surface 531. The annular shoulder recess 61 of the flange 22A results in an outer part of the flange 22A being thinner than an inner part of the flange 22A.

The other components of the imaging apparatus according to the second embodiment are substantially identical to those of the imaging apparatus 1 according to the first embodiment, and therefore the imaging apparatus according to the second embodiment achieves the advantageous benefits that are identical to those achieved by the imaging apparatus 1 of the first embodiment.

Additionally, the flange 22A includes the limit member 60 for limiting the seepage of the uncured adhesive GL. The limit member 60 prevents the uncured adhesive GL from seeping toward the space defined between the non-adhesive section 531b of the front-end surface 531 and the corresponding outer part of the rear end surface 222 of the flange 22A, which faces the non-adhesive section 531b. This efficiently contributes to the ensuring of the imaging accuracy of the imaging apparatus of the second embodiment.

Specifically, the flange 22A has formed in the outer part of the rear end surface 222 of the flange 22A, which faces the non-adhesive section 531b, the annular shoulder recess 61 as the limit member 60. The annular shoulder recess 61 stems the flowing out of the uncured adhesive GL, thus preventing the uncured adhesive GL from seeping toward the space defined between the non-adhesive section 531b of the front-end surface 531 and the corresponding outer part of the rear end surface 222 of the flange 22A, which faces the non-adhesive section 531b.

Modification of the Second Embodiment

The configuration of the annular shoulder recess 61 is not limited to that illustrated in FIG. 9. The annular inner edge of the annular shoulder recess 61 can be inclined such that an extending line of the annular inner edge crosses the center axis CL of the lens barrel 20.

Third Embodiment

Figure 10:
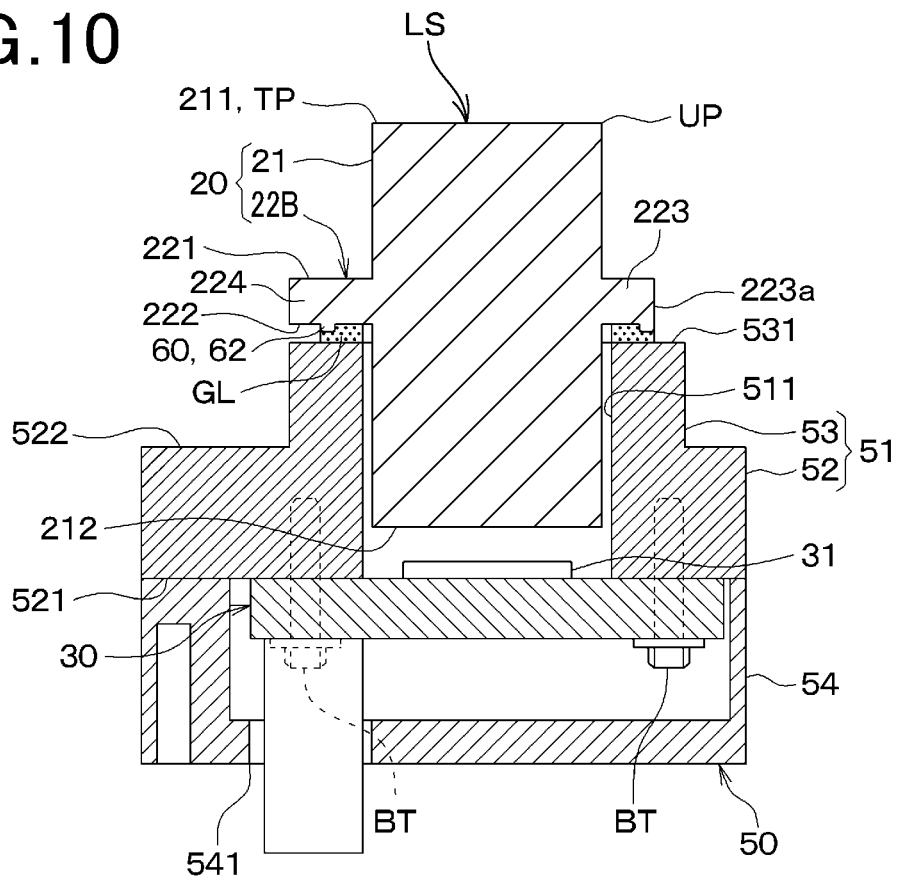
FIG. 10 is a schematic longitudinal cross-sectional view of a camera module included in an imaging apparatus according to the third embodiment of the present disclosure.

The following describes an imaging apparatus according to the third embodiment of the present disclosure with reference to FIG. 10. The structure and/or functions of the imaging apparatus according to the third embodiment are mainly identical to those of the imaging apparatus 1 except for the following points. The following therefore describes mainly the different points.

Referring to FIG. 10, the lens barrel 20 includes, as the limit member 60, an annular protrusion 62 protruding from the inner part of the rear end surface 222 of the flange 22B, which faces the adhesive section 531a, toward the adhesive section 531a.

The annular protrusion 62 has a substantially rectangular shape in longitudinal cross section perpendicular to the left/right direction LR. The annular protrusion 62 also has an annular outer edge aligned with the boundary between the adhesive section 531a and the non-adhesive section 531b of the front-end surface 531.

The other components of the imaging apparatus according to the third embodiment are substantially identical to those of the imaging apparatus 1 according to the first embodiment, and therefore the imaging apparatus according to the third embodiment achieves the advantageous benefits that are identical to those achieved by the imaging apparatus 1 of the first embodiment.

Additionally, the lens barrel 20 includes, as the limit member 60, the annular protrusion 62 protruding from the inner part of the rear end surface 222 of the flange 22B, which faces the adhesive section 531a, toward the adhesive section 531a.

An annular end surface and an annular inner surface of the annular protrusion 62 of the lens barrel 20 respectively serve as adhesive surfaces adhesively secured to the uncured adhesive GL. This ensures the adhesive strength of the assembly of the lens barrel 20 and the case 50 in the shearing direction, making it possible to ensure the reliability of the bonding between the lens barrel 20 and the case 50.

In particular, the annular protrusion 62 stems the flowing out of the uncured adhesive GL, thus preventing the uncured adhesive GL from seeping toward the space defined between the non-adhesive section 531b of the front-end surface 531 and the corresponding outer part of the rear end surface 222 of the flange 22B, which faces the non-adhesive section 531b.

Modification of the Third Embodiment

The configuration of the annular protrusion 62 is not limited to that illustrated in FIG. 10. The annular protrusion 62 can have one of other shapes, such as a triangular shape or a semicircular shape, in longitudinal cross section perpendicular to the left/right direction LR.

Fourth Embodiment

Figure 11A:
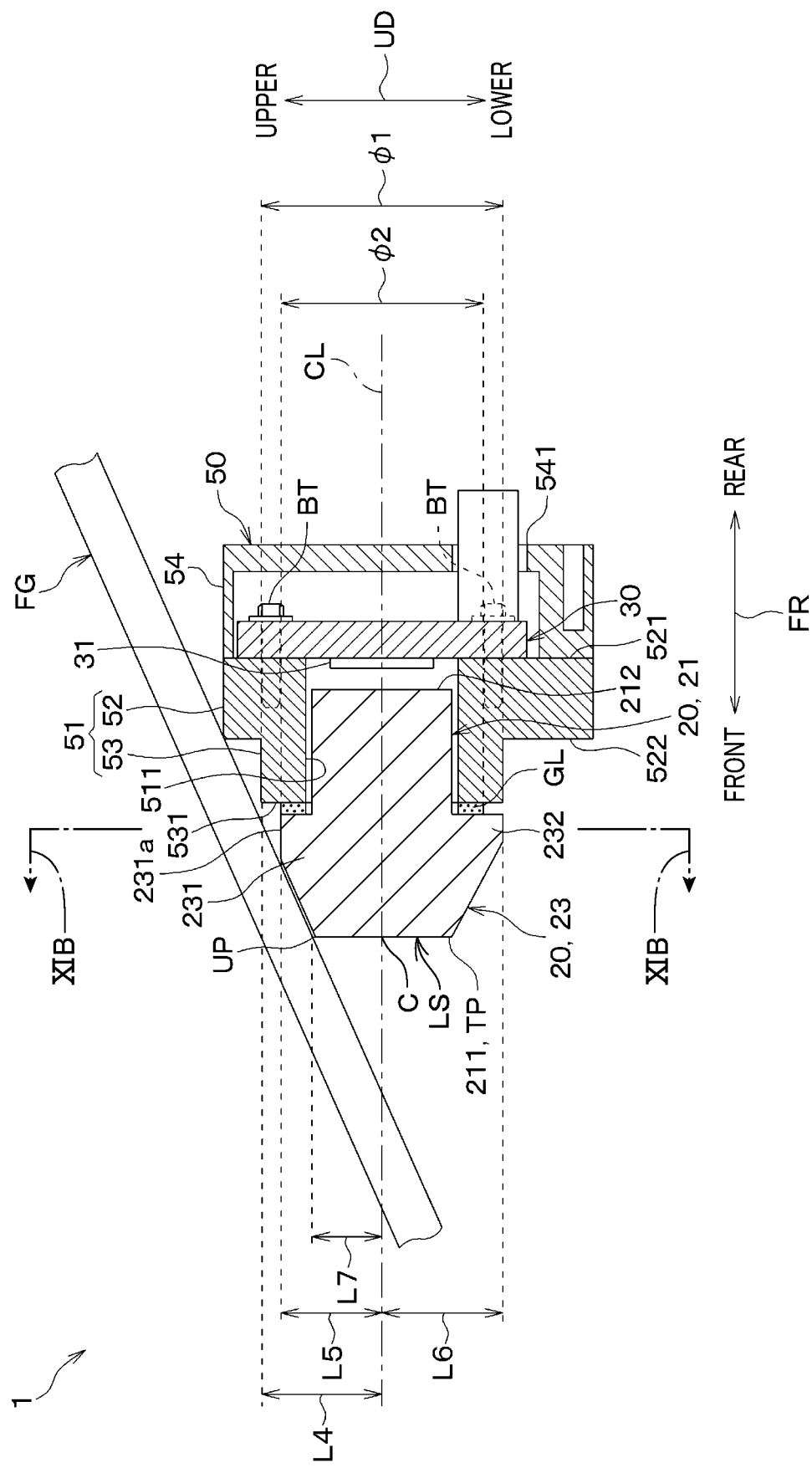
FIG. 11A is a schematic longitudinal cross-sectional view of a camera module included in an imaging apparatus while the camera module is installed in a vehicle according to the fourth embodiment of the present disclosure.
Figure 11B:
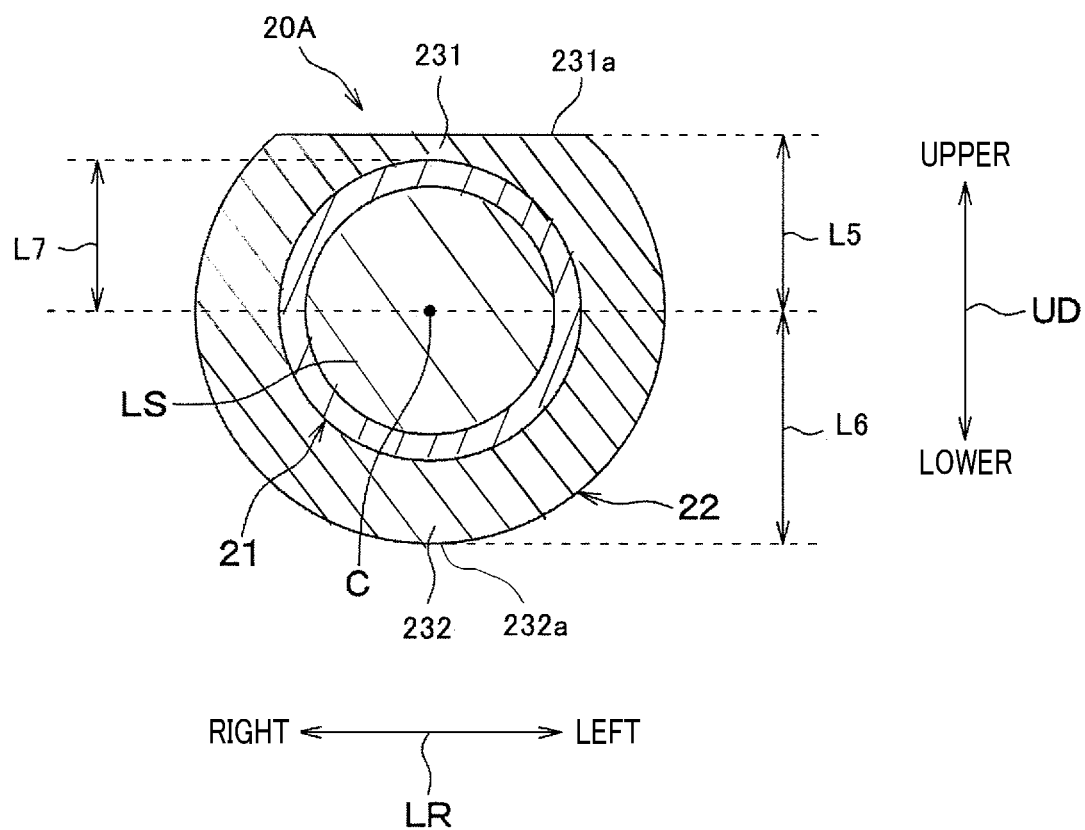
FIG. 11B is a schematic longitudinal cross-sectional view taken along line XIB-XIB in FIG. 11A.

The following describes an imaging apparatus according to the fourth embodiment of the present disclosure with reference to FIGS. 11A and 11B. The structure and/or functions of the imaging apparatus according to the fourth embodiment are mainly identical to those of the imaging apparatus 1 except for the following points. The following therefore describes mainly the different points.

The barrel body 21 of a lens barrel 20A of the camera module 10 according to the fourth embodiment is comprised of a rear portion, most of which is accommodated in the case 50, and a front portion located at the front of the rear portion.

The lens barrel 20A includes an annular large-diameter portion 23 that has an outer diameter larger than a diameter of the barrel body 21.

The large-diameter portion 23 according to the fourth embodiment serves as a protrusion member that protrudes, from the outer peripheral surface of the barrel body 21, toward a direction away from the center axis CA of the at least one lens LS.

Referring to FIG. 11A, the large-diameter portion 23 has a substantially D shape outline in its lateral cross section perpendicular to the center axis CL of the lens barrel 20A; the D-shaped outline of the large-diameter portion 23 has a circular segment arc and a liner segment when viewed in a direction parallel to the center axis CL of the lens barrel 20A. The D-shaped outline of the large-diameter portion 23 enables the large-diameter portion 23 to be less likely to interfere with the front windshield FG.

The assembly of the front portion of the barrel body 21 and the large-diameter portion 23 that surrounds the front portion has a substantially truncated cone shape, so that the diameter of the large-diameter portion 23 is tapered toward the front end 211 (TP) of the barrel body 21. That is, the assembly of the front portion of the barrel body 21 and the large-diameter portion 23 that surrounds the front portion preferably has a substantially truncated cone shape, but can have another shape, such as a cylindrical shape.

In particular, the large-diameter portion 23 is comprised of an upper portion 231 and a lower portion 232. The upper portion 231 is located above the center axis CL of the lens barrel 20A in the height direction HD; the center axis CL of the lens barrel 20A corresponds to the optical axis CA of the at least one lens LS. The lower portion 232 is located below the center axis CL of the lens barrel 20A in the height direction UD.

The upper portion 231 of the large-diameter portion 23 has an uppermost end 231a configured as a flat surface extending in the left-right direction LR. The lower portion 232 has a lowermost end 232a that is aligned in a vertical line VL passing through the center axis CL of the lens barrel 20A; the vertical line VL is parallel to the height direction UD. A minimum distance from the uppermost end 231a of the upper portion 231 to the center axis CL of the lens barrel 20A is expressed as L5, and a minimum distance from the lowermost end 232a of the lower portion 232 to the center axis CL of the lens barrel 20A is expressed as L6. At that time, the large-diameter portion 23 is configured such that the distance L5 is smaller than the distance L6, which is represented as L5<L6.

The front end 211 of the barrel body 21 of the lens barrel 20A while the lens barrel 20A is installed in the vehicle V is located forwardmost in the lens barrel 20. The front end 211, to which reference character TP is assigned, has the upper end UP, and the upper end UP of the front end 211 of the barrel body 21 is located below the uppermost end 231a of the upper portion 231 of the large-diameter portion 23 in the height direction UD. Specifically, a minimum distance L7 from the upper end UP of the front end 211 of the barrel body 21 in the height direction UD is expressed as L7. The large-diameter portion 23 is configured such that the minimum distance L5 is greater than the minimum distance L7, which is represented as L5>L7.

Additionally, the uppermost end 231a of the upper portion 231 of the large-diameter portion 23 is, as illustrated in FIG. 11, located below the uppermost end of the front-end surface 531 of the cylindrical tubular member 53 in the height direction. Specifically, as described above, the minimum distance from the center axis CL of the lens barrel 20 to the uppermost end of the front-end surface in the height direction UD is expressed as L4. The large-diameter portion 23 is configured such that the minimum distance L5 is smaller than the minimum distance L4, which is represented as L5<L4.

The other components of the imaging apparatus according to the fourth embodiment are substantially identical to those of the imaging apparatus 1 according to the first embodiment.

Specifically, because the large-diameter portion 23 according to the fourth embodiment serves as a component equivalent to the flange 22 according to the first embodiment, the imaging apparatus according to the fourth embodiment achieves the advantageous benefits that are identical to those achieved by the imaging apparatus 1 of the first embodiment.

Fifth Embodiment

Figure 12:
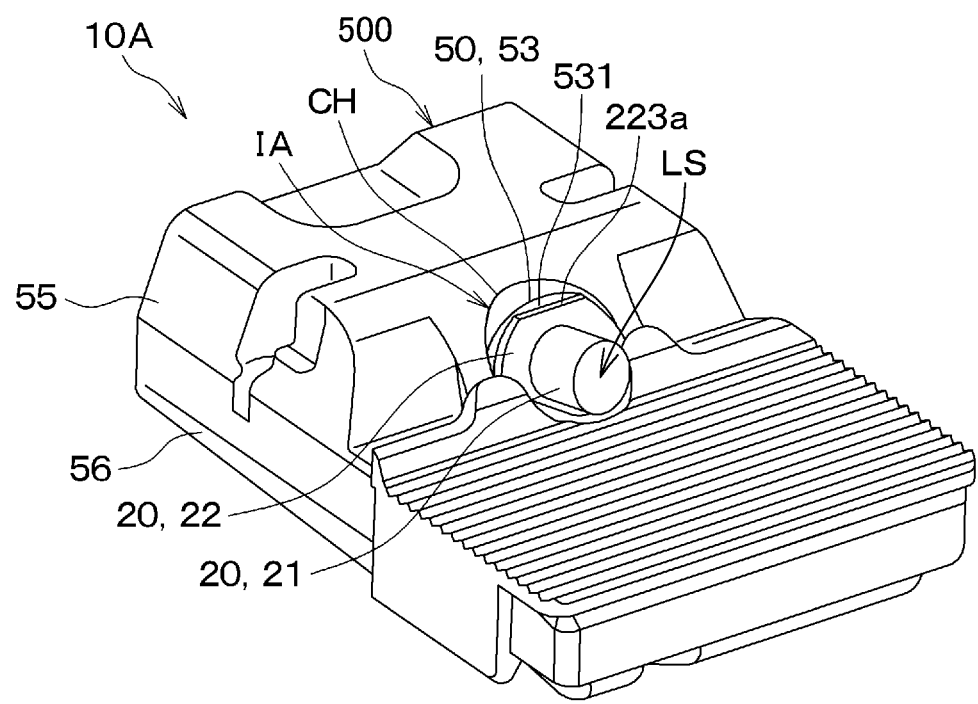
FIG. 12 is a schematic perspective view of a camera module included in an imaging apparatus according to the fifth embodiment of the present disclosure.
Figure 13:
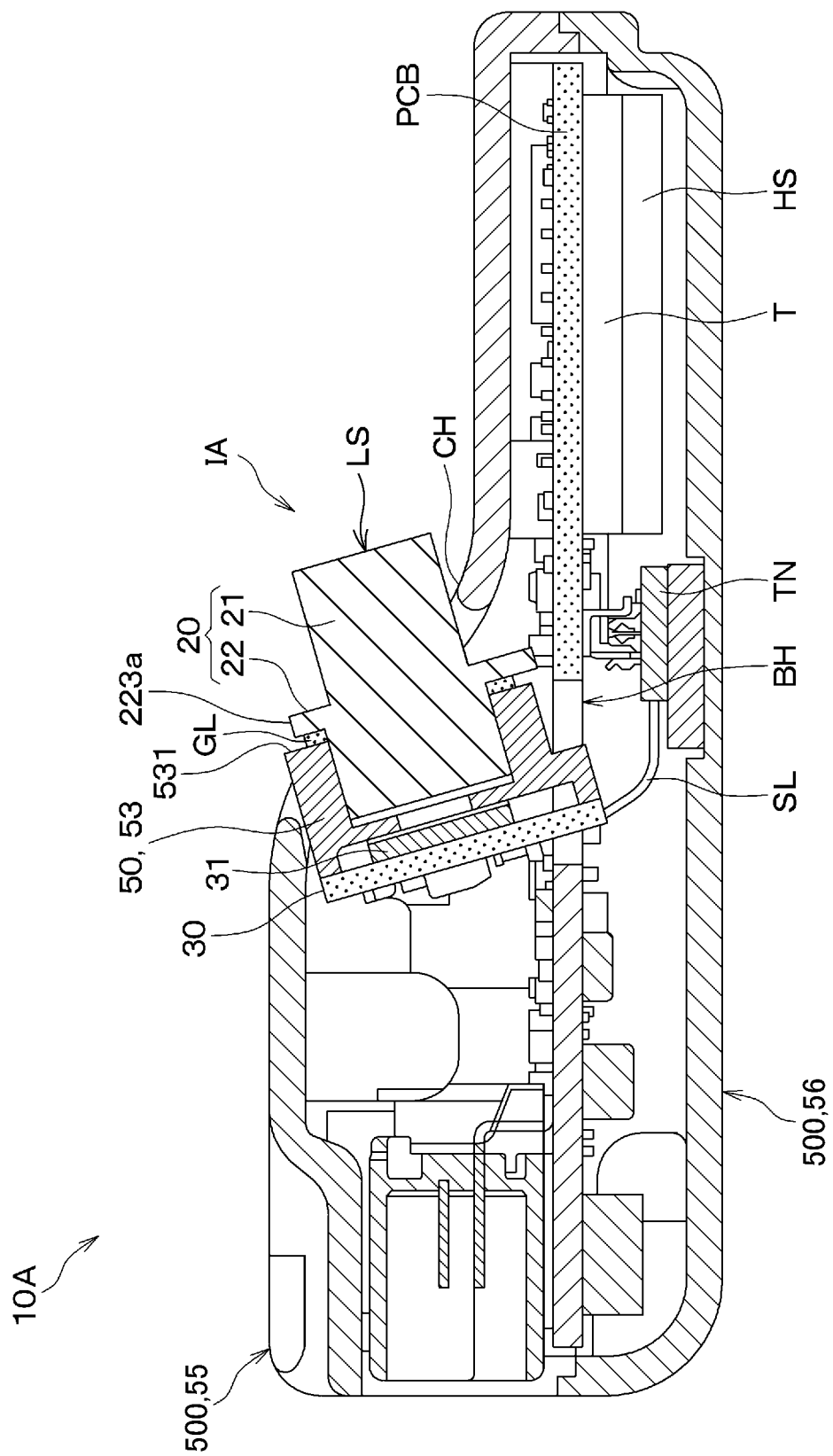
FIG. 13 is a schematic longitudinal cross-sectional view of the camera module according to the fifth embodiment.
Figure 14:
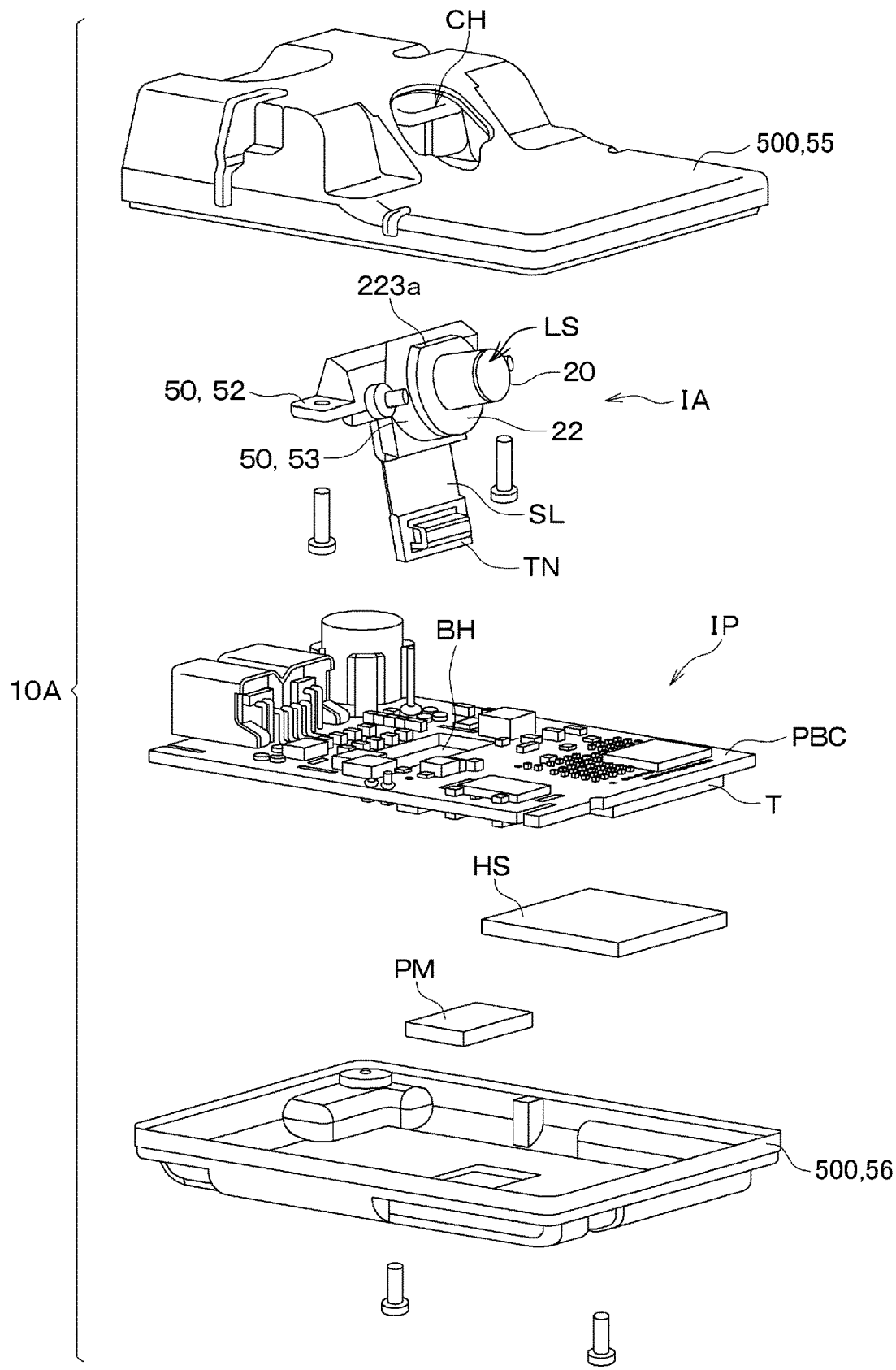
FIG. 14 is an exploded perspective view of the camera module according to the fifth embodiment.

The following describes an imaging apparatus according to the fifth embodiment of the present disclosure with reference to FIGS. 12 to 14. The structure and/or functions of the imaging apparatus according to the fifth embodiment are mainly identical to those of the imaging apparatus 1 except for the following points. The following therefore describes mainly the different points.

The imaging apparatus of the fifth embodiment includes a camera module 10A, and the camera module 10A includes a case assembly 500 in which the image processing apparatus IP according to the fifth embodiment is installed.

Referring to FIGS. 12 to 14, the camera module 10A is comprised of an imager assembly IA, the case assembly 500, and a main printed-circuit board PCB constituting the image processing apparatus IP.

The imager assembly IA is configured as an assembly of the at least one lens LS, the lens barrel 20, the circuit board 30, the base 51 of the case 50, which have been described in the first embodiment, a signal output member SL, and terminals TN.

The signal output member SL is operative to externally output the analog and/or digital signals of images captured by and outputted from the imager 31 of the imager assembly IA. The signal output member SL can be comprised of a flexible board.

The terminals TN are connected between the signal output member SL and the main printed-circuit board PCB, and is operative to transmit the analog and/or digital signals of images captured by and outputted from the imager 31 of the imager assembly IA to the main printed-circuit board PCB. Because the other components of the imager assembly IA are substantially identical to those of the camera module 10 according to the first embodiment, descriptions of which are therefore omitted.

The main printed-circuit board PCB constitutes the image processing apparatus IP.

Specifically, the main printed-circuit board PCB is located below the lens barrel 20 of the imager assembly IA.

The main printed-circuit board PCB has opposing first and second major surfaces. A wiring pattern and one or more IC chips are mounted on at least the first major surface of the main printed-circuit board PCB. The one or more circuit chips T are operative to perform variable tasks based on the analog and/or digital signals of images captured by and outputted from the imager 31; these analog and/or digital signals are transmitted from the imager 31 through the signal output member SL and the terminals TN.

The camera module 10A includes a heatsink HS mounted on the one or more circuit chips T. The heatsink HS is operative to dissipate heat from the one or more circuit chips T.

The main printed-circuit board PCB has an opening BH formed therethrough; the opening BH enables, for example, the terminals TN to be guided toward the lower side of the main printed-circuit board PCB.

The case assembly 500 is comprised of an upper case 55 and a lower case 56. The upper case 55 has a substantially rectangular-parallelepiped shape in which an upper housing space is formed. The upper case 55 also has an outer lower edge. The lower case 56 has a substantially rectangular-parallelepiped shape, which is configured to be in conformity with that of the upper case 55. The lower case 56 has a lower housing space formed therein, and an outer upper edge. The outer lower edge of the upper case 55 and the outer upper edge of the lower case 56 are bonded together to constitute the case assembly 500 in which a combined housing space comprised of the upper and lower housing spaces is defined. The imager assembly IA, the main printed-circuit board PCB, and other peripheral devices are installed in the combined housing space of the case assembly 500. In particular, the main printed-circuit board PCB is disposed on a bottom wall of the lower case 56 via a protective member PM, which contains, for example, a cushion member; the protective member PM is configured to protect the main printed-circuit board PCB.

The upper case 55 has an opening CH formed therein. The imager assembly IA is installed in the combined housing space such that at least the front end 211 (TP) of the lens barrel 20 is exposed outwardly.

The other components of the imaging apparatus according to the fourth embodiment are substantially identical to those of the imaging apparatus 1 according to the first embodiment.

Modifications

The present disclosure is not limited to the typical first to fifth embodiments set forth above, and can be variously modified.

The flange 22 of the lens barrel 20 has a substantially D shape in its lateral cross section perpendicular to the center axis CL of the lens barrel 20, but can have another shape. Similarly, the large-diameter portion 23 has a substantially D shape in its lateral cross section perpendicular to the center axis CL of the lens barrel 20A, but can have another shape.

The uppermost end 223*a* of the upper portion 223 of the flange 22 is located below the uppermost end of the front-end surface 531 of the cylindrical tubular member 53, but can be located to be flush with or located above the uppermost end of the front-end surface 531. Similarly, the uppermost end 231*a* of the upper portion 231 of the large-diameter portion 23 is located below the uppermost end of the front-end surface 531 of the cylindrical tubular member 53, but can be located to be flush with or located above the uppermost end of the front-end surface 531.

The uppermost end UP of the front end 211 (TP) of the barrel body 21 is located below the uppermost end 223*a* of the upper portion 223 of the flange 22, but can be located to be flush with or located above the uppermost end 223*a* of the upper portion 223 of the flange 22. Similarly, the upper end UP of the front end 211 (TP) of the barrel body 21 is located below the uppermost end 231*a* of the upper portion 231 of the large-diameter portion 23, but can be located to be flush with or located above the uppermost end 231*a* of the upper portion 231 of the large-diameter portion 23.

Each of the first to fifth embodiments describes the components of the corresponding one of the imaging apparatuses. One or more components in any of the first to fifth embodiments cannot be identical to those in the other embodiments.

One or more components in each exemplary embodiment are not necessarily essential components except for (i) one or more components that are described as one or more essential components or (ii) one or more components that are essential in principle.

Specific values disclosed in each exemplary embodiment, each of which represents the number of components, a physical quantity, and/or a range of a physical parameter, are not limited thereto except that (i) the specific values are obviously essential or (ii) the specific values are essential in principle.

The specific function or configuration of each component described in each exemplary embodiment is not limited thereto except for cases in which (1) the specific function or configuration is described to be essential or (2) the specific function or configuration is required in principle. Similarly, the specific structural or functional relationship between components described in each exemplary embodiment is not limited thereto except for cases in which (1) the specific structural or functional relationship is described to be essential or (2) the specific structural or functional relationship is required in principle.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An imaging apparatus to be installed in a vehicle in which a height direction of the imaging apparatus is perpendicular to a width direction of the vehicle, the vehicle including a front windshield, the imaging apparatus comprising:
   at least one lens having an optical axis that is perpendicular to the height direction and the width direction;
   a lens barrel located adjacently to the front windshield, the lens barrel comprising:
       a barrel body in which the at least one lens is accommodated, the barrel body having an outer surface around the optical axis; and a protrusion member arranged to protrude, from the outer surface of the barrel body, toward a direction away from the optical axis of the at least one lens;
a circuit module comprised of a circuit board and an imager mounted to the circuit board;
an adhesive; and
a case arranged to hold at least the circuit board, the case having a facing end surface, the facing end surface of the case having:
an adhesive section that faces the protrusion member with the adhesive interposed between the facing end surface and the protrusion member; and
a non-adhesive section that faces the protrusion member without intervention of the adhesive between the non-adhesive section and the protrusion member,
the protrusion member comprising:
an upper portion located above the optical axis of the at least one lens in the height direction, and having an upper end in the height direction; and
a lower portion located below the optical axis of the at least one lens in the height direction, and having a lower end in the height direction,
the upper end of the upper portion having a first minimum distance with respect to the optical axis of the at least one lens, the lower end of the lower portion having a second minimum distance with respect to the optical axis of the at least one lens,
the protrusion member being configured such that the first minimum distance is smaller than the second minimum distance, wherein:
the barrel body has a cylindrical tubular shape having an outer peripheral surface as the outer surface;
the protrusion member is configured as a substantially annular flange that has a substantially D shape in a lateral cross section perpendicular to the optical axis of the at least one lens, and radially extends from the outer peripheral surface of the barrel body; and
the upper end of the upper portion of the substantially annular flange is configured as a substantially flat surface extending in the width direction.

2. The imaging apparatus according to claim 1, wherein:
the facing end surface has an upper end in the height direction; and
the upper end of the upper portion of the protrusion member is located below the upper end of the facing end surface in the height direction.

3. The imaging apparatus according to claim 1, wherein:
the lens barrel has a forwardmost end in a forward direction of the vehicle:
a front end of the lens barrel has an upper end in the height direction; and
the upper end of the forwardmost end of the lens barrel is located below the upper end of the upper portion of the protrusion member in the height direction.

4. The imaging apparatus according to claim 1, further comprising:
a limit member provided for the protrusion member and configured to limit a seepage of the adhesive.

5. The imaging apparatus according to claim 4, wherein:
the protrusion member has an end surface that faces the facing end surface of the case; and
the limit member comprises a recess formed in the end surface of the protrusion member.

6. The imaging apparatus according to claim 4, wherein:
the protrusion member has an end surface that faces the facing end surface of the case; and
the limit member comprises a protrusion configured to protrude from the end surface of the protrusion member toward the facing end surface of the case.

7. The imaging apparatus according to claim 1, wherein:
the barrel body has a cylindrical tubular shape having an outer peripheral surface as the outer surface; and
the protrusion member is configured as a substantially annular large-diameter portion that has an outer diameter larger than a diameter of the barrel body.

8. The imaging apparatus according to claim 7, wherein:
the upper end of the upper portion of the substantially annular large-diameter portion is configured as a substantially flat surface extending in the width direction.

9. An imaging apparatus to be installed in a vehicle in which a height direction of the imaging apparatus is perpendicular to a width direction of the vehicle, the vehicle including a front windshield, the imaging apparatus comprising:
at least one lens having an optical axis that is perpendicular to the height direction and the width direction;
a lens barrel located adjacently to the front windshield, the lens barrel comprising:
a barrel body in which the at least one lens is accommodated, the barrel body having an outer surface around the optical axis; and
a protrusion member arranged to protrude, from the outer surface of the barrel body, toward a direction away from the optical axis of the at least one lens;
a circuit module comprised of a circuit board and an imager mounted to the circuit board;
an adhesive; and
a case arranged to hold at least the circuit board, the case having a facing end surface,
the facing end surface of the case having:
an adhesive section that faces the protrusion member with the adhesive interposed between the facing end surface and the protrusion member; and
a non-adhesive section that faces the protrusion member without intervention of the adhesive between the non-adhesive section and the protrusion member,
the protrusion member comprising:
an upper portion located above the optical axis of the at least one lens in the height direction, and having an upper end in the height direction; and
a lower portion located below the optical axis of the at least one lens in the height direction, and having a lower end in the height direction,
the upper end of the upper portion having a first minimum distance with respect to the optical axis of the at least one lens, the lower end of the lower portion having a second minimum distance with respect to the optical axis of the at least one lens,
the protrusion member being configured such that the first minimum distance is smaller than the second minimum distance, wherein:
the protrusion member is configured as a substantially annular large-diameter portion that has a substantially D shape in a lateral cross section perpendicular to the optical axis of the at least one lens, and has an outer diameter larger than a diameter of the barrel body; and
the barrel body has a cylindrical tubular shape having an outer peripheral surface as the outer surface; and
the upper end of the upper portion of the substantially annular large-diameter portion is configured as a substantially flat surface extending in the width direction.

* * * * *